(12) United States Patent
Jose et al.

(10) Patent No.: US 11,836,127 B2
(45) Date of Patent: Dec. 5, 2023

(54) UNIQUE IDENTIFICATION OF METRIC VALUES IN TELEMETRY REPORTS

(71) Applicant: Dell Products, L.P., Round Rock, TX (US)

(72) Inventors: Cyril Jose, Austin, TX (US); Jon Robert Hass, Austin, TX (US); Michael Emery Brown, Austin, TX (US); Choudary Maddukuri, Austin, TX (US); Sankara Rao Gara, Cedar Park, TX (US); Mahesh Babu Ramaiah, Geddalahalli (IN); Sankunny Jayaprasad, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 157 days.

(21) Appl. No.: 17/221,120

(22) Filed: Apr. 2, 2021

(65) Prior Publication Data
US 2022/0318220 A1  Oct. 6, 2022

(51) Int. Cl.
*G06F 16/22* (2019.01)
(52) U.S. Cl.
CPC ................ *G06F 16/2272* (2019.01)

(58) Field of Classification Search
CPC ............................ G06F 16/22; G06F 16/2272
See application file for complete search history.

(56) References Cited

U.S. PATENT DOCUMENTS

| | | | |
|---|---|---|---|
| 2018/0089328 A1* | 3/2018 | Bath | G06F 16/22 |
| 2018/0234519 A1* | 8/2018 | Boyapalle | H04L 67/06 |
| 2021/0149877 A1* | 5/2021 | Endo | G06F 16/27 |
| 2021/0301985 A1* | 9/2021 | Brown | G05B 23/0221 |

* cited by examiner

Primary Examiner — Grace Park
(74) Attorney, Agent, or Firm — Fogarty LLP (57) ABSTRACT

Embodiments provide unique identification of telemetry reports generated by components of an IHS (Information Handling System) that supports a plurality of metric data sources. A source of metric data is detected, where the source may be a fixed or replaceable IHS component. The metric source is identified within a device descriptor table maintained by a remote access controller of the IHS. Based on a unique user-friendly label that is associated with the metric data source in the device descriptor table, the metric source is configured to generate metric reports. The generated metric reports are received and the label provided by the metric source is used to store data from the metric reports in a database row using the label as a unique database key. The user-friendly label can be used to perform efficient database queries without using a separate database column for storing a user-friendly description of the metric source.

20 Claims, 3 Drawing Sheets

UNIQUE IDENTIFICATION OF METRIC VALUES IN TELEMETRY REPORTS

FIELD

The present disclosure generally relates to Information Handling Systems (IHSs), and, more particularly, to telemetry systems used by IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

The operation of an IHS may be characterized by metrics that provide a measurable aspect of the IHS's operation. For instance, an IHS metric may provide environmental sensor readings, such a temperature sensor measurement, or an operational sensor reading, such as the amps being drawn by a component of the IHS. An IHS metric may also provide discrete information, such as the operational state of a component. An IHS metric may also provide a logical rather than physical sensor measurement, such as a digital counter sensor measuring the amount of data transferred by a networking component of the IHS. An IHS may utilize a telemetry system in order to configure and manage the collection of metric reports from various sources of metric data within the IHS. Using the metric data collected by a telemetry system, the operation of an IHS may be monitored and managed remotely. For example, based on readings collected from temperature sensors, failure conditions in a cooling system can be identified and the operation of the cooling system may be adjusted in order to compensate for the failure condition, thus avoiding damage to the IHS. In a data center environment, rack-mounted server IHSs may utilize telemetry systems that support the collection of metric data from a variety of different sources.

SUMMARY

In various embodiments, IHSs (Information Handling Systems) include: a plurality of sources of metric data; and a remote access controller implementing a telemetry system, wherein the remote access controller is configured to: detect a first source of metric data of the plurality of metric data sources; configure the first metric data source to generate a plurality of metric reports, wherein the metric reports are identified using a label that is based on a device descriptor that is associated with the first metric data source within a device descriptor table maintained by the remote access controller; receive a first metric report from the first metric data source; identify the label in first metric report; and store data from the first metric report in a database using the label as a database key for the stored data.

In additional IHS embodiments, the plurality of metric data sources comprises one or more temperature sensors installed at locations within a chassis of the IHS. In additional IHS embodiments, the plurality of metric data sources comprises one or more logical sensors implemented by replaceable components of the IHS. In additional IHS embodiments, the database is a time series database and wherein the stored data from the first metric report comprises a timestamp associated with the first metric report. In additional IHS embodiments, the device descriptor uniquely identifies the first metric source from the other plurality of sources of metric data of the IHS. In additional IHS embodiments, the device descriptor specifies an installed location within the IHS of the first source of metric data. In additional IHS embodiments, the installed location specified by the device descriptor comprises a bay of the IHS. In additional IHS embodiments, the remote access controller is further configured to determine the first source of metric data is compatible with the telemetry system. In additional IHS embodiments, the remote access controller configures the first metric data source via a sideband signaling pathway utilized by the remote access controller.

In various additional embodiments, methods are provided for unique identification of telemetry reports generated by components of an IHS. The methods include: detecting a first source of metric data among a plurality of metric data sources supported by the IHS; identifying the first metric source within a device descriptor table maintained by a remote access controller of the IHS; configuring the first metric data source to generate a plurality of metric reports, wherein the metric reports are identified using a label that is based on a device descriptor that is associated with the first metric data source in the device descriptor table; receiving a first metric report from the first metric data source; identifying the label in first metric report; and storing data from the first metric report in a database using the label as a database key for the stored data.

In additional method embodiments, the database is a time series database and wherein the stored data from the first metric report comprises a timestamp associated with the first metric report. In additional method embodiments, the device descriptor uniquely identifies the first metric source from the other plurality of sources of metric data of the IHS. In additional method embodiments, the device descriptor specifies an installed location within the IHS of the first source of metric data. In additional method embodiments, the installed location specified by the device descriptor comprises a bay of the IHS. In additional embodiments, the methods further include determining the first source of metric data is compatible with the telemetry system. In additional embodiments, the methods further include configuring the first metric data source via a sideband signaling pathway utilized by the remote access controller.

In various additional embodiments, remote access controllers provide unique identification of telemetry reports generated by components of an IHS. The remote access controllers may include: one or more processors; and a memory device coupled to the one or more processors, the memory device storing computer-readable instructions that, upon execution by the one or more processors, cause the remote access controller to: detect a first source of metric data among a plurality of metric data sources supported by the IHS; configure the first metric data source to generate a plurality of metric reports, wherein the metric reports are identified using a label that is based on a device descriptor that is associated with the first metric data source within a device descriptor table maintained by the remote access controller; receive a first metric report from the first metric data source; identify the label in first metric report; and store data from the first metric report in a database using the label as a database key for the stored data.

In additional remote access controller embodiments, the device descriptor uniquely identifies the first metric source from the other plurality of sources of metric data of the IHS. In additional remote access controller embodiments, the device descriptor specifies an installed location within the IHS of the first source of metric data. In additional remote access controller embodiments, the installed location specified by the device descriptor comprises a bay of the IHS.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
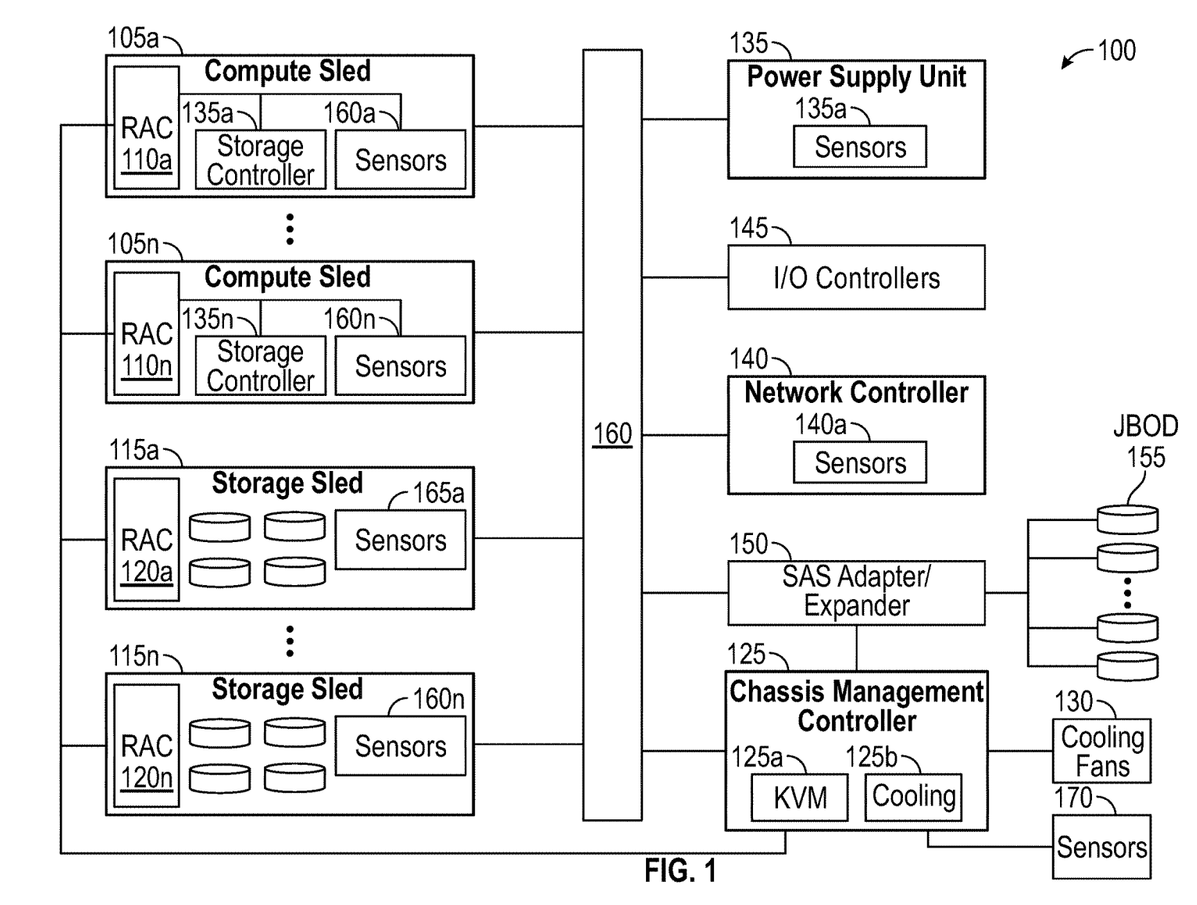
FIG. 1 is a diagram illustrating certain components of a chassis, according to some embodiments, for unique identification of metric reports generated by various components of the chassis.

FIG. 1 is a block diagram illustrating certain components of a chassis 100 comprising one or more compute sleds 105a-n and one or more storage sleds 115a-n that may be configured to implement the systems and methods described herein for unique identification of metric reports generated by various components of the chassis 100. Chassis 100 may include one or more bays that each receive an individual sled (that may be additionally or alternatively referred to as a tray, blade, server, drive and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Other embodiments may include additional types of sleds that provide various types of storage and/or processing capabilities. Other types of sleds may provide power management and networking functions. Sleds may be individually installed and removed from the chassis 100, thus allowing the computing and storage capabilities of a chassis to be reconfigured by swapping the sleds with different types of sleds, in many cases without affecting the ongoing operations of the other sleds installed in the chassis 100.

Multiple chassis 100 are typically housed within a rack, with each chassis installed in one or more slots of the rack. Data centers may utilize large numbers of racks, with various different types of chassis installed in the various rack configurations. The modular architecture provided by the sleds, chassis and rack allow for certain resources, such as cooling, power and network bandwidth, to be shared by the compute sleds 105a-n and storage sleds 115a-n, thus providing efficiency and supporting various types of computational loads.

Chassis 100 may be installed within a rack that provides all or part of the cooling utilized by chassis 100. For airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air from within the sleds 105a-n, 115a-n that are installed within the chassis. A rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to connectors provided by front-facing bays of the chassis 100, where these connectors physically and electrically couple an individual sled to a backplane 160 of the chassis, where the backplane may be additionally or alternatively be referred to as a midplane. Chassis backplane 160 may be a printed circuit board that includes electrical traces and connectors that are configured to route signals between components of chassis 100 that are connected to the backplane 160. In various embodiments, backplane 160 may include various additional components, such as cables, wires, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140 and power supply unit 135.

Figure 2:
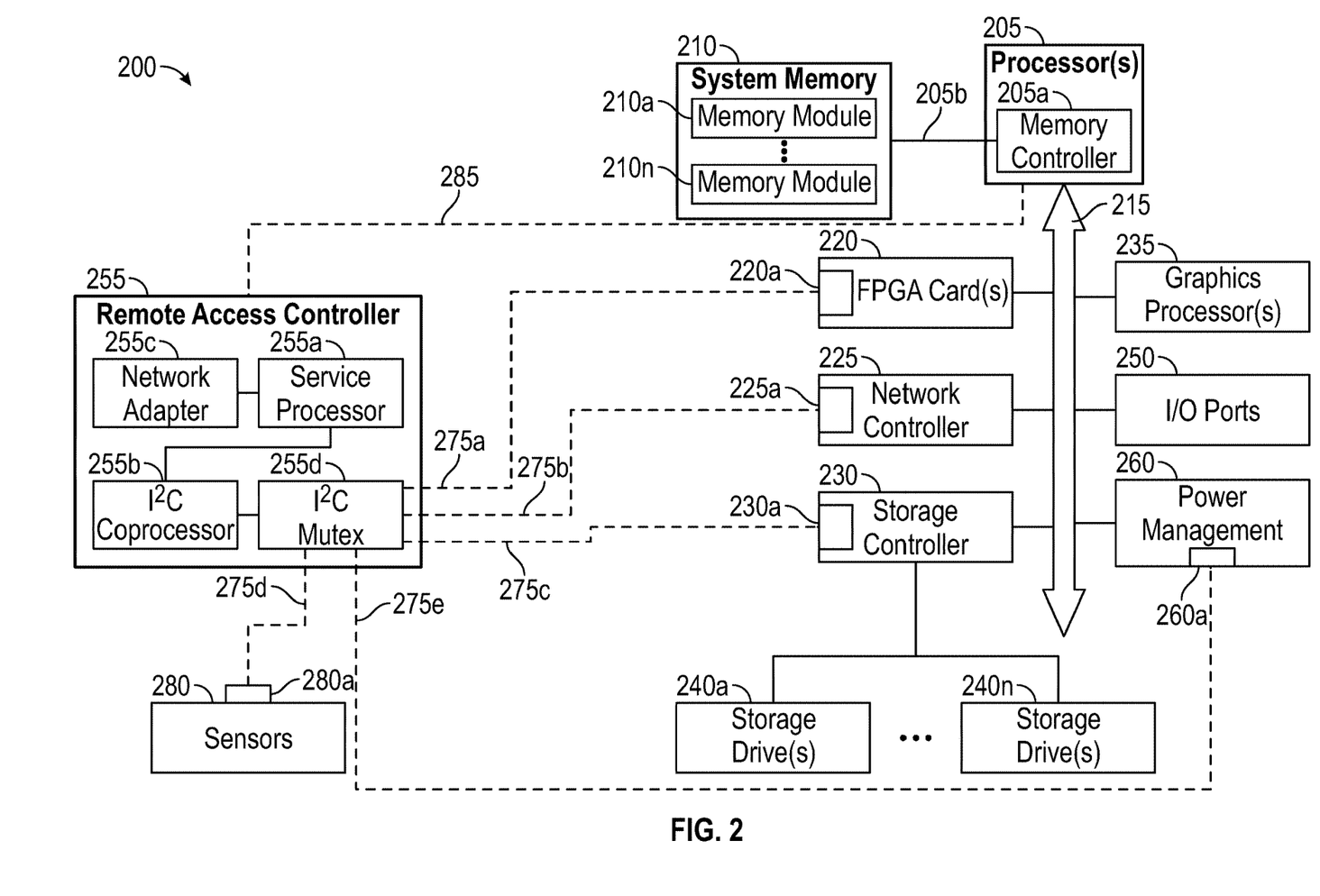
FIG. 2 is a diagram illustrating certain components of an IHS configured as a component of chassis, according to some embodiments, for unique identification of metric reports generated by various components of the IHS.

In certain embodiments, a compute sled 105a-n may be an IHS such as described with regard to IHS 200 of FIG. 2. A compute sled 105a-n may provide computational processing resources that may be used to support a variety of e-commerce, multimedia, business and scientific computing applications, such as services provided via a cloud implementation. Compute sleds 105a-n are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 105a-n may be configured for general-purpose computing or may be optimized for specific computing tasks.

As illustrated, each compute sled 105a-n includes a remote access controller (RAC) 110a-n. As described in additional detail with regard to FIG. 2, each remote access controller 110a-n provides capabilities for remote monitoring and management of compute sled 105a-n. In support of these monitoring and management functions, remote access controllers 110a-n may utilize both in-band and sideband (i.e., out-of-band) communications with various components of a compute sled 105a-n and chassis 100. As illustrated, each compute sled 105a-n may include one or more sensors 160a-n. As described in additional detail below, the sensors 160a-n may generate various types of metric data that characterize aspects of the operation of a respective compute sled 105a-n. For instance, sensors 160a-n may collect metric data characterizing the performance of processing, networking, power and/or memory components of a compute sled 105a-n, as well as monitoring environmental properties, such as compute sled temperatures. As described in additional detail below, these components of compute sled 105a-n may be configured to generate and report sensor metric data, where the generated metric reports are uniquely identified using a label that may be used as a key for storing this reported metric data to a database, as well as providing a user-friendly description of the metric data. In some embodiments, remote access controller 110a-n may configure various managed components for the collection and reporting of metric data in this manner. Using this collected metric data, each remote access controller 110a-n may implement various monitoring and administrative functions related to compute sleds 105a-n.

Each of the compute sleds 105a-n includes a storage controller 135a-n that may be utilized to access storage drives that are accessible via chassis 100. Some of the individual storage controllers 135a-n may provide support for RAID (Redundant Array of Independent Disks) configurations of logical and physical storage drives, such as storage drives provided by storage sleds 115a-n. In some embodiments, some or all of the individual storage controllers 135a-n may be HBAs (Host Bus Adapters) that provide more limited capabilities in accessing physical storage drives provided via storage sleds 115a-n and/or via SAS expander 150.

As illustrated, chassis 100 also includes one or more storage sleds 115a-n that are coupled to the backplane 160 and installed within one or more bays of chassis 200 in a similar manner to compute sleds 105a-n. Each of the individual storage sleds 115a-n may include various different numbers and types of storage devices. For instance, storage sleds 115a-n may include SAS (Serial Attached SCSI) magnetic disk drives, SATA (Serial Advanced Technology Attachment) magnetic disk drives, solid-state drives (SSDs) and other types of storage drives in various combinations. The storage sleds 115a-n may be utilized in various storage configurations by the compute sleds 105a-n that are coupled to chassis 100. As illustrated, each storage sled 115a-n may include one or more sensors 165a-n. The sensors 165a-n may generate various types of metric data that characterize aspects of the operation of a respective storage sled 115a-n. For instance, sensors 165a-n may collect metric data characterizing the performance of a storage sled 115a-n, such as data transfer rates and hard disk drive RPMs, as well as monitoring environmental properties, such as storage sled temperatures. As described in additional detail below, storage sleds 115a-n, or a storage controller 135a-n that manages access to storage sleds 115a-n, may be configured to generate and report this metric data, where the generated metric reports are uniquely identified using a label that may be used as a key for storing this reported metric data to a database, as well as providing a user-friendly description of the metric data.

In addition to the data storage capabilities provided by storage sleds 115a-n, chassis 100 may provide access to other storage resources that may be installed components of chassis 100 and/or may be installed elsewhere within a rack housing the chassis 100, such as within a storage blade. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that may be configured and managed individually and without implementing data redundancy across the various drives 155. The additional storage resources 155 may also be at various other locations within a datacenter in which chassis 100 is installed. Such additional storage resources 155 may also be remotely located.

As illustrated, the chassis 100 of FIG. 1 includes a network controller 140 that provides network access to the sleds 105a-n, 115a-n installed within the chassis. Network controller 140 may include various switches, adapters, controllers and couplings used to connect chassis 100 to a network, either directly or via additional networking components and connections provided via a rack in which chassis 100 is installed. As with compute sleds 105a-n and storage sleds 115a-n, network controller 140 may include one or more sensors 140a that may include physical sensors, such as a temperature sensor providing thermal metrics, and logical sensors, such as capabilities reporting metrics of input and output data transfer rates. Also as with the sensors of compute sleds 105a-n and storage sleds 115a-n, the sensors 140a of network controller 140 may be configured to generate and report this sensor metric data, where the generated metric reports are uniquely identified using a label that may be used as a key for storing this reported metric data to a database, as well as providing a user-friendly description of the metric data.

Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that provides chassis 100 with redundant, hot-swappable power supply units. As illustrated, power supply unit 135 may include one or more sensors 135a that may include physical sensors, such as a temperature sensor providing thermal and power output metrics, and logical sensors, such as capabilities that report discrete power settings. As above, the sensors 135a of power supply unit 135 may be configured to generate and report metric data, where the generated metric reports are uniquely identified using a label that may be used as a key for storing this reported metric data to a database, as well as providing a user-friendly description of the metric data.

Chassis 100 may also include various I/O controllers 145 that may support various I/O ports, such as USB ports that may be used to support keyboard and mouse inputs and/or video display capabilities. Such I/O controllers 145 may be utilized by a chassis management controller 125 to support various KVM (Keyboard, Video and Mouse) 125a capabilities that provide administrators with the ability to interface with the chassis 100. In addition to providing support for KVM 125a capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125. In some embodiments, the operations of a chassis management controller 125 may be implemented by one of the compute sled or storage sled remote access controllers 110a-n, 120a-n that has been designated and configured for managing chassis-level configurations. In some embodiments, chassis management controller 125 may receive metric reports from one or more sensors 170 that are components of chassis 100, such as temperature sensors at various chassis locations that provide inlet and exhaust temperature measurements. In such embodiments, such chassis sensors 170 be configured to generate and report metric data, where the generated metric reports are uniquely identified using a label that may be used as a key for storing this reported metric data to a database, as well as providing a user-friendly description of the metric data.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 shows an example of an IHS 200 configured to implement systems and methods described herein for unique identification of metric reports generated by various components of the IHS 200. It should be appreciated that although the embodiments described herein may describe an IHS that is a compute sled, server or similar computing component that may be deployed within a rack-mounted chassis, other embodiments may be utilized with other types of IHSs. In the illustrative embodiment of FIG. 2, IHS 200 may be a computing component, such as compute sled 105*a-n*, that is configured to share infrastructure resources provided by a chassis 100. In some embodiments, IHS 200 may be a server, such as a 1RU (Rack Unit) server, that is installed within a slot of a chassis, such as a 2RU chassis, with another 1RU IHS server installed in the other slot of the chassis.

The IHS 200 of FIG. 2 may be a compute sled, such as compute sleds 105*a-n* of FIG. 1, that may be installed within a chassis, that may in turn be installed within a rack. Installed in this manner, IHS 200 may utilized shared power, network and cooling resources provided by the chassis and/or rack. IHS 200 may utilize one or more processors 205. In some embodiments, processors 205 may include a main processor and a co-processor, each of which may include a plurality of processing cores that, in certain scenarios, may be used in operating multiple virtualized computing environments. In certain embodiments, one or all of processor(s) 205 may be graphics processing units (GPUs) in scenarios where IHS 200 has been configured to support functions such as multimedia services and graphics applications.

In some embodiments, processor 205 may be configured to operate as a source of metric data providing physical sensor data, such as junction temperatures and power consumption. Processor 205 may also be configured to operate as a source logical sensor data, such as remaining CPU processing capacity. In some embodiments, processor 205 may be configured by remote access controller 255 to generate metrics that are reported to the remote access controller, where the configuration and reporting of this metric data may be via a PECI (Platform Environment Control Interface) bus 285 operations. Processor 205 may be configured to generate and report such metric data in a manner, where the generated metric reports are uniquely identified using a label that may be used as a key for storing this reported metric data to a database, as well as providing a user-friendly description of the metric data.

As illustrated, processor(s) 205 includes an integrated memory controller 205*a* that may be implemented directly within the circuitry of the processor 205, or the memory controller 205*a* may be a separate integrated circuit that is located on the same die as the processor 205. The memory controller 205*a* may be configured to manage the transfer of data to and from the system memory 210 of the IHS 200 via a high-speed memory interface 205*b*. In some embodiments, memory controller 205*a* may be configured to operate as a source of metric data capable of generating metric reports that are reported to remote access controller 255. The metric data reported by memory controller 205*a* may include metrics such as the amount of available system memory 210 and memory transfer rates via memory interface 205*b*. The metric reporting capabilities of memory controller 205*a* may be configured to generate and report such metric data, where the generated metric reports are uniquely identified using a label that may be used as a key for storing this reported metric data to a database, as well as providing a user-friendly description of the metric data.

The system memory 210 is coupled to processor(s) 205 via a memory bus 205*b* that provides the processor(s) 205 with high-speed memory used in the execution of computer program instructions by the processor(s) 205. Accordingly, system memory 210 may include memory components, such as such as static RAM (SRAM), dynamic RAM (DRAM), NAND Flash memory, suitable for supporting high-speed memory operations by the processor(s) 205. In certain embodiments, system memory 210 may combine both persistent, non-volatile memory and volatile memory. In certain embodiments, the system memory 210 may be comprised of multiple removable memory modules. The system memory 210 of the illustrated embodiment includes removable memory modules 210*a-n*. Each of the removable memory modules 210*a-n* may correspond to a printed circuit board memory socket that receives a specific type of removable memory module 210*a-n*, such as a DIMM (Dual In-line Memory Module), that can be coupled to the socket and then decoupled from the socket as needed, such as to upgrade memory capabilities or to replace faulty components. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more buses 215. Various embodiments may utilize any number of buses to provide the illustrated pathways served by bus 215. In certain embodiments, bus 215 may include a PCIe (PCI Express) switch fabric that is accessed via a PCIe root complex. IHS 200 may also include one or more I/O ports 250, such as PCIe ports, that may be used to couple the IHS 200 directly to other IHSs, storage resources or other peripheral components.

In certain embodiments, a graphics processor 235 may be comprised within one or more video or graphics cards, or an embedded controller, installed as components of the IHS 200. In certain embodiments, graphics processor 235 may be an integrated of the remote access controller 255 and may be utilized to support the display of diagnostic and administrative interfaces related to IHS 200 via display devices that are coupled, either directly or remotely, to remote access controller 255.

In the illustrated embodiments, processor(s) 205 is coupled to a network controller 225, such as provided by a Network Interface Controller (NIC) that is coupled to the IHS 200 and allows the IHS 200 to communicate via an external network, such as the Internet or a LAN. As illustrated, network controller 225 may be instrumented with a controller or other logic unit 225a that supports a sideband management connection 275b with remote access controller 255. Via the sideband management connection 275b, network controller 225 may be configured to operate as a source of metric data that may include environmental metrics, such as a temperature measurements, and logical sensors, such as metrics reporting input and output data transfer rates. Network controller 225 may be configured to generate and report such metric data in a manner where the metric report uniquely identifies the reported metric data using a unique identifier that may be used as a key for storing this reported metric data to a database, as well as providing a user-friendly description of the metric data.

Processor(s) 205 may also be coupled to a power management unit 260 that may interface with the power system unit 135 of the chassis 100 in which IHS 200 may be installed. As with network controller 225, power management unit 260 may be instrumented with a controller or other logic unit 260a that supports a sideband management connection 275e with remote access controller 255. Via the sideband management connection 275e, power management unit 255 may be configured to operate as a source of metric data that may include physical metrics, such as a sensors providing temperature measurements and sensors providing power output measurements, and logical sensors, such as capabilities reporting discrete power settings. Power management unit 255 may be configured to generate and report such metric data in a manner where the generated metric reports are uniquely identified using a label that may be used as a key for storing this reported metric data to a database, as well as providing a user-friendly description of the metric data.

As illustrated, IHS 200 may include one or more FPGA (Field-Programmable Gate Array) card(s) 220. Each FPGA card 220 supported by IHS 200 may include various processing and memory resources, in addition to an FPGA integrated circuit that may be reconfigured after deployment of IHS 200 through programming functions supported by the FPGA card 220. FGPA card 220 may be optimized to perform specific processing tasks, such as specific signal processing, security, data mining, and artificial intelligence functions, and/or to support specific hardware coupled to IHS 200. FPGA card 220 may include one or more physical and/or logical sensors. As specialized computing components, FPGA cards may be used to support large-scale computational tasks that may result in the FPGA card 220 generating significant amounts of heat. In order to protect specialized FPGA cards from damaging levels of heat, FPGA card 220 may be outfitted with multiple temperature sensors. FPGA card 220 may also include logical sensors that are sources of metric data, such as metrics reporting numbers of calculations performed by the programmed circuitry of the FPGA. The FPGA card 220 may also include a management controller 220a that may support interoperation was the remote access controller 255 via a sideband device management bus 275a. The management controller 220a of FPGA card 220 may be configured to generate and report metric data in a manner where the generated metric reports are uniquely identified using a label that may be used as a key for storing this reported metric data to a database, as well as providing a user-friendly description of the metric data.

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 255.

In certain embodiments, remote access controller 255 may operate from a different power plane from the processors 205 and other components of IHS 200, thus allowing the remote access controller 255 to operate, and management tasks to proceed, while the processing cores of IHS 200 are powered off. As described, various functions provided by the BIOS, including launching the operating system of the IHS 200, may be implemented by the remote access controller 255. In some embodiments, the remote access controller 255 may perform various functions to verify the integrity of the IHS 200 and its hardware components prior to initialization of the IHS 200 (i.e., in a bare-metal state).

IHS 200 may include one or more storage controllers 230 that may be utilized to access storage drives 240a-n that are accessible via the chassis in which IHS 100 is installed. Storage controller 230 may provide support for RAID (Redundant Array of Independent Disks) configurations of logical and physical storage drives 240a-n. In some embodiments, storage controller 230 may be an HBA (Host Bus Adapter) that provides more limited capabilities in accessing physical storage drives 240a-n. In some embodiments, storage drives 240a-n may be replaceable, hot-swappable storage devices that are installed within bays provided by the chassis in which IHS 200 is installed. In some embodiments, storage drives 240a-n may also be accessed by other IHSs that are also installed within the same chassis as IHS 100. In embodiments where storage drives 240a-n are hot-swappable devices that are received by bays of chassis, the storage drives 240a-n may be coupled to IHS 200 via couplings between the bays of the chassis and a midplane of IHS 200. Storage drives 240a-n may include SAS (Serial Attached SCSI) magnetic disk drives, SATA (Serial Advanced Technology Attachment) magnetic disk drives, solid-state drives (SSDs) and other types of storage drives in various combinations.

In some embodiments, remote access controller 255 may also be directly coupled via I2C couplings 275d with one or more sensors 280, such as sensors that provide measurements of ambient inlet temperatures, outlet airflow temperatures and temperatures at various locations within IHS 200. Sensors 280 coupled directly to remote access controller 255 may also be used in implementing security protocols, such as intrusion detection sensors and user proximity sensors. Sensors 280 may include logic units or other controllers 280a that are be configured by remote access controller 255 to generate and report metric data, where the generated metric reports are uniquely identified using a label that may be used as a key for storing this reported metric data to a database, as well as providing a user-friendly description of the metric data.

As illustrated, storage controller 230 may be instrumented with a controller or other logic unit 230a that supports a sideband management connection 275c with remote access controller 255. Via the sideband management connection 275c, storage controller 230 may be configured to operate as a source of metric data regarding the operation of storage drives 240a-n. For instance, controller 230a may collect metric data characterizing the performance of individual storage drives 240a-n, such as available storage capacity and data transfer rates, as well as environmental properties, such as storage drive temperatures. A controller or other logic unit 230a of storage controller 230 may be configured to generate and report such metric data in a manner where the generated metric reports are uniquely identified using a label that may be used as a key for storing this reported metric data to a database, as well as providing a user-friendly description of the metric data.

Remote access controller 255 may include a service processor 255a, or specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225c may support connections with remote access controller 255 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 255 may support monitoring and administration of various managed devices 220, 225, 230, 260, 280 of an IHS via a sideband bus interface. For instance, messages utilized in device management may be transmitted using I2C sideband bus connections 275a-e that may be individually established with each of the respective managed devices 220, 225, 230, 260, 280 through the operation of an I2C multiplexer 255d of the remote access controller. As illustrated, certain of the managed devices of IHS 200, such as FPGA cards 220, network controller 225, storage controller 230 and power management unit 260, are coupled to the IHS processor(s) 205 via an in-line bus 215, such as a PCIe root complex, that is separate from the I2C sideband bus connections 275a-e used for device management.

In certain embodiments, the service processor 255a of remote access controller 255 may rely on an I2C co-processor 255b to implement sideband I2C communications between the remote access controller 255 and managed components 220, 225, 230, 260, 280 of the IHS. The I2C co-processor 255b may be a specialized co-processor or micro-controller that is configured to interface via a sideband I2C bus interface with the managed hardware components 220, 225, 230, 260, 280 of IHS. In some embodiments, the I2C co-processor 255b may be an integrated component of the service processor 255a, such as a peripheral system-on-chip feature that may be provided by the service processor 255a. Each I2C bus 275a-e is illustrated as single line in FIG. 2. However, each I2C bus 275a-e may be comprised of a clock line and data line that couple the remote access controller 255 to I2C endpoints 220a, 225a, 230a, 260a, 280a on each of the managed components.

As illustrated, the I2C co-processor 255b may interface with the individual managed devices 220, 225, 230, 260, 280 via individual sideband I2C buses 275a-e selected through the operation of an I2C multiplexer 255d. Via switching operations by the I2C multiplexer 255d, a sideband bus connection 275a-e may be established by a direct coupling between the I2C co-processor 255b and an individual managed device 220, 225, 230, 260, 280. In providing sideband management capabilities, the I2C co-processor 255b may each interoperate with corresponding endpoint I2C controllers 220a, 225a, 230a, 260a, 280a that implement the I2C communications of the respective managed devices 220, 225, 230, 260, 280. The endpoint I2C controllers 220a, 225a, 230a, 260a, 280a may be implemented as dedicated microcontrollers for communicating sideband I2C messages with the remote access controller 255, or endpoint I2C controllers 220a, 225a, 230a, 260a, 280a may be integrated SoC functions of a processor of the respective managed device endpoints 220, 225, 230, 260, 280.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
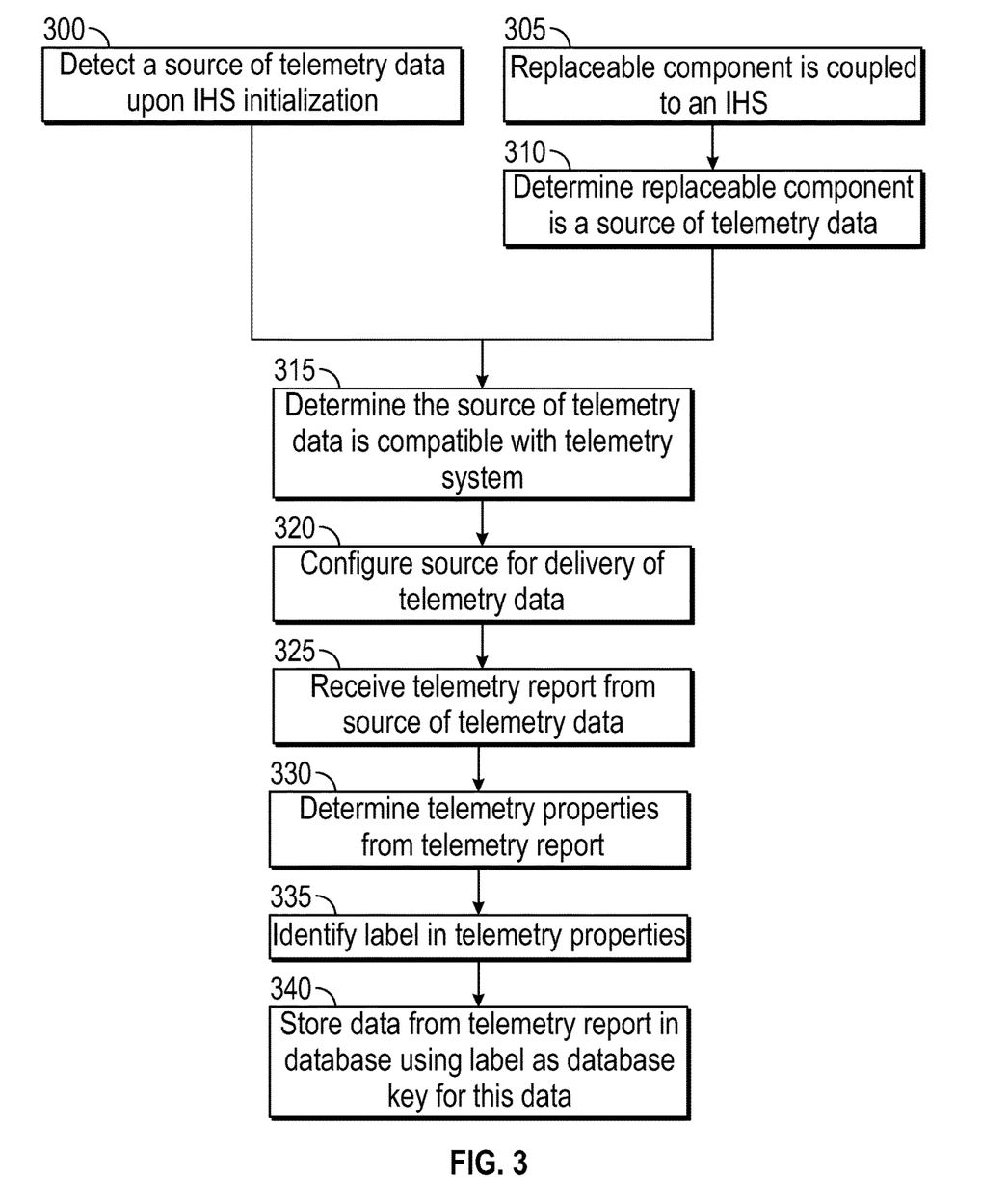
FIG. 3 is a flowchart describing certain steps of a method, according to some embodiments, for unique identification of metric reports generated by components of an IHS.

FIG. 3 is a flowchart describing certain steps of a method, according to some embodiments, for unique identification of metric reports generated by various components of an IHS. As described above, a telemetry system may be implemented using both physical and logical sensors. Some of the physical sensors may be fixed sensors, such as temperature sensors installed at physical locations within an IHS or a chassis. Some physical sensors may be installed within replaceable components of an IHS, such as a temperature sensor of a storage device that may be swapped out of a drive bay of a rack-mounted server IHS. Logical sensors that are sources of metric information may similarly be installed at fixed locations, such as sensors providing CPU and memory utilization measurements, or may be located in replaceable components, such as a swappable network controller that generates metrics that report data transfer rates.

Accordingly, some scenarios may begin at block 300 upon initialization of an IHS with the detection of a source of metric data. Upon being initialized, a variety of booting and security procedures may be undertaken by an IHS, including booting an operating system. As part of these booting procedures, a remote access controller may inventory the various hardware components of an IHS. In some embodiments, a remote access controller of an IHS may utilize a device descriptor table that specifies the hardware supported by the IHS. During booting, the remote access controller may utilize such a device descriptor table in order to identify the hardware components of an IHS. As part of a hardware component identification sequence, the remote access controller may also determine whether each identified hardware component is a source of telemetry data. Once identified, the remote access controller may configure the supported hardware components as sources of metric data reports.

Some scenarios may instead begin at block 305 with the coupling of a replaceable hardware component to an IHS, such as a hot-swappable component supported by an IHS. For instance, a storage drive may be inserted into an empty front-facing drive bay of rack mounted server IHS, in some cases while the IHS remains operational. In another example, an IHS may support a hot-swappable network interface card that may be inserted into a rear-facing slot of IHS. Upon detecting the coupling of such replaceable components to an IHS, the remote access controller may determine whether the detected component is a source of telemetry data. As above, such determinations may be made by the remote access controller using a device descriptor table that specifies the hardware components that are supported by an IHS.

At block 315, the remote access controller may further utilize information provided in the device descriptor table in order to determine whether the identified source of telemetry data is compatible with telemetry system described herein. In some instances, the remote access controller may interrogate the component in order to determine whether the component is configured for generating metric reports that uniquely identify the reported metrics using a label that is provided by the remote access controller. If the identified metric source is compatible with the telemetry system, at block 320 the remote access controller configures the metric source for delivery of telemetry data reports to the remote access controller. The remote access controller may configure the metric source for delivery of metric reports on a periodic basis and/or based on the triggering of specified thresholds. As described with regard to FIG. 2, the remote access controller may utilize a sideband connection for interfacing directly with certain components of an IHS in implementing monitoring and management operations by the remote access controller. In such embodiments, the remote access controller may utilize such sideband signaling pathways for interrogating the managed components and configuring them for delivery of metric reports.

In configuring the metric sources, the remote access controller may provide the metric source with a device descriptor label to be used by the metric source in uniquely identifying its reported metrics. In existing systems, sources of telemetry data may be able to identify a type of metric information that is being provided, but are unable to uniquely identify the generated metric information. For example, a temperature sensor may be able to specify that the metric information it reports is a temperature measurement. Other sensors in existing system are similarly able to report a type for the sensor, such as a network controller sensor specifying it reports data output levels. However, in systems that utilize several sensors of the same type at different locations, existing telemetry systems are unable to uniquely identify the metric reports received from these identical sensors. For instance, in a multi-fan airflow cooling system, fan sensors reporting fan RPMs do not provide a useful identification of the particular fan to which the report pertains. This shortcoming of existing telemetry systems is also evident in metric reports by storage drives that do not uniquely identify reported metric information in a system that may include numerous identical storage drives. Existing systems may resolve such issues through various lookups and/or queries that are able to uniquely identify a source of reported metric data. Such procedures of existing system require repeated queries that slow the telemetry system, and thus burden components such as the remote access controller, or require the complexity of generating and maintaining tables that can be used to uniquely identify the source of received metric reports. These shortcomings of existing telemetry systems are present in the DMTF (Distributed Management Task Force) Redfish telemetry system that is used in many datacenters applications.

Some existing telemetry systems may address this issue by configuring sources of metric information to report metrics using a unique device identifier. For instance, metric reports submitted by storage drives may include a unique alphanumeric string that is assigned to each individual storage drive by its manufacturer. Metric reports submitted by network interface controllers may similarly be configured to include their MAC (Media Access Control) address in submitted metric reports. Such existing approaches may be able to provide unique identification of metric reports, but highlight an additional shortcoming of existing telemetry systems. Such alphanumeric identifiers adequately identify a device and its metric reports uniquely, but are of limited use to administrators in associating a metric report to a component of an IHS. Alphanumeric identifiers also fail to provide administrators with information regarding the installed location of the component that generated the metric report. These shortcomings of existing systems may be addressed by attaching a user-friendly descriptor to a metric report. However, this again requires mapping received metric reports to the correct descriptor so it can be attached to the metric report. Additionally, preserving such user-friendly descriptors in existing telemetry systems requires an additional column in the database table that is used to store the metric data.

Addressing these shortcomings of existing telemetry systems, at block 320, embodiments configure sources of telemetry data to submit metric reports that uniquely identify the metric source and does so using a user-friendly label that can be used as a database key for use in storing the metric data. In some embodiments, remote access controller may configure a source of metric data by providing it with a user-friendly descriptive label that uniquely identifies the metric source. In some instances, the descriptive label provided by the remote access controller may also specify the location in which the metric source is installed. For example, a replaceable storage drive that is inserted in a front-facing bay of a server IHS may be provided with a descriptive label that specifies the type of storage drive and identifies the bay in which it is installed. Descriptive labels provided by the remote access controller to a replaceable network controller may similarly identify the type of the network controller and the slot of the IHS in which it is installed. In IHSs that include multiple processors, the remote access controller may provide each processor with a descriptive label that specifies the motherboard socket location in which the processor is installed. As described with regard to FIG. 2, components that are sources of metric data may include various types of sensors, controllers, storage drives or other logic units that may be configured to generate metric reports. In such systems, the remote access controller may utilize sideband connections with these components in order to configure the generation of metric reports by these components using the provided user-friendly descriptive label.

With the sources of metric data configured in this manner, at block 325, a remote access controller may receive metric reports from the metric sources. At block 330, the remote access controller evaluates the metric data received in the telemetry reports. In some instances, the remote access controller may evaluate the reported metric values, such as evaluating reported temperature information in order to immediately identify critical thermal scenarios. As part of evaluating the data, the remote access controller may also store the received metric data in a designated database for use in further analysis. In other instances, the remote access controller may instead proceed directly to storing the received metric data in the designated database. As part of storing the received metric data in a database, at block 335, the remote access controller may identify the user-friendly descriptive label that is included in the metric report by the metric source.

Using the descriptive label provided by the metric source, at block 340, the metric data report is stored to a designated database. In some embodiments, the metric report that is stored may include a timestamp associated with the report and the metric value that is being reported. Embodiments may store each individual metric report in a row of this database, where the descriptive label is used as the database key for uniquely identifying the metric report amongst the other rows in the metric database. In some embodiments, the database used to store the received metric data may be a time series database in which metric reports associated with the same time stamp are grouped such that the descriptive label uniquely identifies each metric report within a time stamp group. Administrators may utilize the device descriptor information maintained by the remote access controller in order to query the metric database for metric reports generated by a specific component. In this manner, administrators may easily and efficiently issue queries for metric reports using user-friendly labels associated with components of a system. For instance, when investigating metric reports generated by a storage drive installed within a specific bay of a server IHS, an administrator need only look up the device descriptor used by the remote access controller for identifying the storage drive in that bay. Using that device descriptor label, an administrator may issue queries to the metric database for metric reports by that storage drive. These queries may be supported with notable efficiently since the user submits queries using a label that is a database key.

In another scenario, an administrator may be provided with a report of metric data that lists a series of received metric reports. Using embodiments, each metric report in this list includes a user-friendly descriptor that provides an administrator with useful information that describes the source of metric data, including where that source of metric data is installed. Embodiments provide administrators with this capability without requiring the use of an additional database column for storing user-friendly descriptions of a metric source, since the user-friendly descriptor is also used as a database key for each stored metric report.

In some embodiments, the described telemetry system may support two-way telemetry in which telemetry feedback may be transmitted back to the metric data sources. For instance, telemetry feedback may provide a metric data source with confirmations that may trigger deletion of any telemetry data that is stored locally by the metric data source. In other instances, the telemetry feedback may constitute commands that configure the frequency and/or types of telemetry reports issued by the metric data source. For example, based on telemetry data reported by a metric data source, telemetry feedback may be transmitted to the metric data source that directs the data source to increase or decrease the frequency of metric reports that it issues. In another example, telemetry feedback may be transmitted to the metric data source that directs the data source to issue more detailed diagnostic metric reports for a specified duration, or until subsequent telemetry feedback directs the metric data source to revert to generating more concise metric reports.

As described with regard to FIG. 2, a remote access controller may interoperate with metric data sources via I2C sideband bus connections 275*a-e* that may be individually established with each of the respective metric data sources 220, 225, 230, 260, 280 through the operation of an I2C multiplexer 255*d*. Also as described, through use of the user-friendly label, metric reports issued by these data source may be provided directly to users and may be submitted directly to a database without having to maintain a table that maps machine identifiers for these metric data sources to the user-friendly labels. Embodiments may similarly support routing of telemetry feedback to the managed devices based on these user-friendly labels without the use of any translation tables. In such embodiments, upon providing a metric data source with its user-friendly label for use in identifying its telemetry reports, the I2C multiplexer may begin addressing the metric data source using a hash of this user-friendly label as the I2C address that identifies the sideband bus connections 275*a-e* used to access the data source. When configured in this manner, feedback telemetry that identifies the intended recipient using the user-friendly label of the data source may be received by the remote access controller and routed by the I2C multiplexer to the appropriate data source along the appropriate I2C bus by hashing the user-friendly label in order to determine the I2C bus of the data source and thus without having to translate the user-friendly label to any other addressing scheme, thus maintaining the efficiency promoted by embodiments while also supporting two-way telemetry.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An IHS (Information Handling System) comprising:
   one or more processors;
   a plurality of managed hardware components, each a source of metric data; and
   a remote access controller supporting remote management of the IHS, and comprising a plurality of sideband management connections, separate from the one or more processors, for management of the plurality of managed hardware components, and implementing a telemetry system, wherein the remote access controller comprises one or more microcontrollers and a memory device coupled to the one or more microcontrollers, and is configured to:
      detect a first source of metric data comprising a first of the plurality of the managed hardware components of the IHS that are metric data sources;
      determine, based on a device descriptor table utilized by the remote access controller in management of the plurality of managed hardware components, an installed location of the first source of metric data and a user-friendly descriptor of the first source of metric data;
      configure the first source of metric data to generate a plurality of metric reports, wherein the metric reports are identified using a label that includes both the installed location of the first source of metric data and a user-friendly descriptor of the first source of metric data;
      receive a first metric report from the first metric data source;
      identify the label in first metric report; and
      store data from the first metric report in a database using the label, that includes both the installed location and the user-friendly descriptor of the first source of metric data, as a database key for the stored data.

2. The IHS of claim 1, wherein the plurality of metric data sources comprises one or more temperature sensors installed at locations within a chassis of the IHS.

3. The IHS of claim 1, wherein the plurality of metric data sources comprises one or more logical sensors implemented by one or more of the plurality of managed hardware components of the IHS.

4. The IHS of claim 1, wherein the database is a time series database and wherein the stored data from the first metric report comprises a timestamp associated with the first metric report.

5. The IHS of claim 1, wherein the label that includes both the installed location and the user-friendly descriptor of the first source of metric data uniquely identifies the first metric source from the other plurality of sources of metric data of the IHS.

6. The IHS of claim 1, wherein the first source of metric data comprises a sensor and wherein the installed location of the first source of metric data included in the label comprises a location of the sensor within a chassis where the IHS is installed.

7. The IHS of claim 1, wherein the installed location of the first source of metric data included in the label comprises a bay of the IHS.

8. The IHS of claim 1, wherein the remote access controller is further configured to determine the first source of metric data is compatible with the telemetry system.

9. The IHS of claim 1, wherein the remote access controller configures the first metric data source via a first of the sideband management connections of the remote access controller.

10. A method for unique identification of telemetry reports generated by components of an IHS (Information Handling System) comprising one or more processors and a plurality of managed hardware components, each managed by a remote access controller of the IHS via one or more sideband management connections, the method comprising:
    detecting, by the remote access controller, a first source of metric data comprising a first of plurality of managed the managed hardware components of the IHS that are sources of metric data sources;
    determining, based on a device descriptor table utilized by the remote access controller in management of the plurality of managed hardware components, an installed location of the first source of metric data and a user-friendly descriptor of the first source of metric data;
    configuring the first source of metric data to generate a plurality of metric reports, wherein the metric reports are identified using a label that includes both the installed location of the first source of metric data and the a user-friendly descriptor of the first source of metric data;
    receiving a first metric report from the first metric data source;
    identifying the label in first metric report; and
    storing data from the first metric report in a database using the label, that includes both the installed location and the user-friendly descriptor of the first source of metric data, as a database key for the stored data.

11. The method of claim 10, wherein the database is a time series database and wherein the stored data from the first metric report comprises a timestamp associated with the first metric report.

12. The method of claim 10, wherein the label that includes both the installed location and the user-friendly descriptor of the first source of metric data uniquely identifies the first metric source from the other plurality of sources of metric data of the IHS.

13. The method of claim 10, wherein the first source of metric data comprises a sensor and wherein the installed location of the first source of metric data included in the label comprises a location of the sensor within a chassis where the IHS is installed.

14. The method of claim 10, wherein the installed location of the first source of metric data included in the label comprises a bay of the IHS.

15. The method of claim 10, further comprising determining the first source of metric data is compatible with the telemetry system.

16. The method of claim 10, further comprising configuring the first metric data source via a first of the sideband managed connections of the remote access controller.

17. A remote access controller operable for unique identification of telemetry reports generated by components of an IHS (Information Handling System) comprising one or more processors and a plurality of managed hardware components, each managed by the remote access controller via one or more sideband management connections, the remote access controller comprising:
one or more microcontrollers; and
a memory device coupled to the one or more microcontrollers, the memory device storing computer-readable instructions that, upon execution by the one or more microcontrollers, cause the remote access controller to:
detect a first source of metric data comprising a first of plurality of the managed hardware components of the IHS that are metric data sources supported by the IHS;
determine, based on a device descriptor table utilized by the remote access controller in management of the plurality of managed hardware components, an installed location of the first source of metric data and a user-friendly descriptor of the first source of metric data;
configure the first source of metric data to generate a plurality of metric reports, wherein the metric reports are identified using a label that includes both the installed location of the first source of metric data and a user-friendly descriptor of the first source of metric data;
receive a first metric report from the first metric data source;
identify the label in first metric report; and
store data from the first metric report in a database using the label, that includes both the installed location and the user-friendly descriptor of the first source of metric data, as a database key for the stored data.

18. The remote access controller of claim 17, wherein the label that includes both the installed location and the user-friendly descriptor of the first source of metric data uniquely identifies the first metric source from the other plurality of sources of metric data of the IHS.

19. The remote access controller of claim 17, wherein the first source of metric data comprises a sensor and wherein the installed location of the first source of metric data included in the label comprises a location of the sensor within a chassis where the IHS is installed.

20. The remote access controller of claim 17, wherein the installed location of the first source of metric data included in the label comprises a bay of the IHS.

* * * * *